United States Patent
Raslambekov

(10) Patent No.: US 11,253,338 B2
(45) Date of Patent: *Feb. 22, 2022

(54) METHOD OF DETERMINING DEFORMATION OF GINGIVA

(71) Applicant: Oxilio Ltd, Larnaca (CY)

(72) Inventor: Islam Khasanovich Raslambekov, Long Island City, NY (US)

(73) Assignee: ARKIMOS Ltd, Larnaca (CY)

( * ) Notice: Subject to any disclaimer, the term of this patent is extended or adjusted under 35 U.S.C. 154(b) by 0 days.

This patent is subject to a terminal disclaimer.

(21) Appl. No.: 16/998,356

(22) Filed: Aug. 20, 2020

(65) Prior Publication Data

US 2021/0251723 A1  Aug. 19, 2021

Related U.S. Application Data

(63) Continuation of application No. 16/793,468, filed on Feb. 18, 2020, now Pat. No. 10,751,149.

(51) Int. Cl.
*G06T 7/00* (2017.01)
*G06T 17/20* (2006.01)
(Continued)

(52) U.S. Cl.
CPC ............ *A61C 7/002* (2013.01); *G06T 7/0012* (2013.01); *G06T 17/205* (2013.01); *G06T 19/20* (2013.01);
(Continued)

(58) Field of Classification Search
CPC . A61C 7/002; G06T 7/0012; G06T 17/00–30; G06T 19/00–20;
(Continued)

(56) References Cited

U.S. PATENT DOCUMENTS

| 5,975,893 A | 11/1999 | Chishti et al. |
| 6,183,248 B1 | 2/2001 | Chishti et al. |

(Continued)

FOREIGN PATENT DOCUMENTS

| CN | 105608741 A | 5/2016 |
| CN | 106504329 A  * | 3/2017 |

(Continued)

OTHER PUBLICATIONS

Joshi, Pushkar, et al. "Harmonic coordinates for character articulation." ACM Transactions on Graphics (TOG) 26.3 (2007): 71-es. (Year: 2007).*

(Continued)

*Primary Examiner* — Diane M Wills
(74) *Attorney, Agent, or Firm* — BCF LLP

(57) ABSTRACT

Methods, systems, and apparatuses are described for determining deformation of gingiva. A three-dimensional (3D) digital model of an archform comprising a representation of gingiva and a tooth may be received. The 3D model may comprise a 3D mesh describing a surface of the gingiva, the tooth, and a contour between the gingiva and the tooth. A tooth-movement displacement may be applied to the vertices corresponding to the tooth in the 3D mesh and the vertices corresponding to the contour. A vertex-specific displacement may be determined for each of the vertices corresponding to the gingiva by solving a harmonic equation. The 3D digital model may be updated.

17 Claims, 6 Drawing Sheets

(51) Int. Cl.
*G06T 19/20* (2011.01)
*A61C 7/00* (2006.01)

(52) U.S. Cl.
CPC ...... *G06T 2200/04* (2013.01); *G06T 2200/08* (2013.01); *G06T 2207/30036* (2013.01)

(58) Field of Classification Search
CPC ............ G06T 2200/04; G06T 2200/08; G06T 2207/20012; G06T 2207/30036
See application file for complete search history.

(56) References Cited

U.S. PATENT DOCUMENTS

| | | |
|---|---|---|
| 6,227,850 B1 | 5/2001 | Chishti et al. |
| 6,309,215 B1 | 10/2001 | Phan et al. |
| 6,318,994 B1 | 11/2001 | Chishti et al. |
| 6,334,853 B1 | 1/2002 | Kopelman et al. |
| 6,386,878 B1 | 5/2002 | Pavlovskaia et al. |
| 6,398,548 B1 | 6/2002 | Muhammad et al. |
| 6,463,344 B1 | 10/2002 | Pavloskaia et al. |
| 6,471,511 B1 | 10/2002 | Chishti et al. |
| 6,514,074 B1 | 2/2003 | Chishti et al. |
| 6,554,611 B2 | 4/2003 | Chishti et al. |
| 6,602,070 B2 | 8/2003 | Miller et al. |
| 6,665,570 B2 | 12/2003 | Pavloskaia et al. |
| 6,685,470 B2 | 2/2004 | Chishti et al. |
| 6,688,886 B2 | 2/2004 | Hughes et al. |
| 6,705,863 B2 | 3/2004 | Phan et al. |
| 6,726,478 B1 | 4/2004 | Isiderio et al. |
| 6,739,870 B2 | 5/2004 | Lai et al. |
| 6,767,208 B2 | 7/2004 | Kaza |
| 6,948,931 B2 | 9/2005 | Chishti |
| 6,979,196 B2 | 12/2005 | Nikolskiy et al. |
| 7,040,896 B2 | 5/2006 | Pavlovskaia et al. |
| 7,059,850 B1 | 6/2006 | Phan et al. |
| 7,063,532 B1 | 6/2006 | Jones et al. |
| 7,123,767 B2 | 10/2006 | Jones et al. |
| 7,125,248 B2 | 10/2006 | Phan et al. |
| 7,134,874 B2 | 11/2006 | Chishti et al. |
| 7,220,122 B2 | 5/2007 | Chishti |
| 7,241,142 B2 | 7/2007 | Abolfathi et al. |
| 7,293,988 B2 | 11/2007 | Wen |
| 7,320,592 B2 | 1/2008 | Chishti et al. |
| 7,373,286 B2 | 5/2008 | Nikolskiy et al. |
| 7,377,778 B2 | 5/2008 | Chishti et al. |
| 7,428,481 B2 | 9/2008 | Nikolskiy et al. |
| 7,442,040 B2 | 10/2008 | Kuo |
| 7,578,674 B2 | 8/2009 | Chishti et al. |
| 7,637,740 B2 | 12/2009 | Knopp |
| 7,689,398 B2 | 3/2010 | Cheng et al. |
| 7,771,195 B2 | 8/2010 | Knopp et al. |
| 7,826,646 B2 | 11/2010 | Pavlovskaia et al. |
| 7,841,858 B2 | 11/2010 | Knopp et al. |
| 7,844,429 B2 | 11/2010 | Matov et al. |
| 7,865,259 B2 | 1/2011 | Kuo et al. |
| 7,904,307 B2 | 3/2011 | Abolfathi et al. |
| 7,905,725 B2 | 3/2011 | Chishti et al. |
| 7,942,672 B2 | 5/2011 | Kuo |
| 7,993,134 B2 | 8/2011 | Wen |
| 8,038,444 B2 | 10/2011 | Kitching et al. |
| 8,044,954 B2 | 10/2011 | Kitching et al. |
| 8,047,847 B2 | 11/2011 | Kaufmann |
| 8,083,522 B2 | 12/2011 | Karkar et al. |
| 8,108,189 B2 | 1/2012 | Chelnokov et al. |
| 8,131,393 B2 | 3/2012 | Matov et al. |
| 8,135,569 B2 | 3/2012 | Matov et al. |
| 8,244,390 B2 | 8/2012 | Kuo et al. |
| 8,275,180 B2 | 9/2012 | Kuo |
| 8,439,672 B2 | 5/2013 | Matov et al. |
| 8,465,280 B2 | 6/2013 | Sachdeva et al. |
| 8,478,435 B2 | 7/2013 | Kuo et al. |
| 8,639,477 B2 | 1/2014 | Chelnokov et al. |
| 8,641,414 B2 | 2/2014 | Borovinskih et al. |
| 8,706,672 B2 | 4/2014 | Malfliet |
| 8,734,150 B2 | 5/2014 | Wen |
| 8,780,106 B2 | 7/2014 | Chishti et al. |
| 8,807,999 B2 | 8/2014 | Kuo et al. |
| 8,896,592 B2 | 11/2014 | Boltunov et al. |
| 8,897,902 B2 | 11/2014 | See et al. |
| 8,961,173 B2 | 2/2015 | Miller |
| 9,060,829 B2 | 6/2015 | Sterental et al. |
| 9,107,722 B2 | 8/2015 | Matov et al. |
| 9,161,823 B2 | 10/2015 | Morton et al. |
| 9,211,166 B2 | 12/2015 | Kuo et al. |
| 9,326,831 B2 | 5/2016 | Cheang |
| 9,345,557 B2 | 5/2016 | Anderson et al. |
| 9,375,293 B2 | 6/2016 | Taub et al. |
| 9,375,300 B2 | 6/2016 | Matov et al. |
| 9,414,897 B2 | 8/2016 | Wu et al. |
| 9,433,476 B2 | 9/2016 | Khardekar et al. |
| 9,529,970 B2 | 12/2016 | Andreiko |
| 9,592,103 B2 | 3/2017 | Taub et al. |
| 9,610,140 B2 | 4/2017 | Anderson et al. |
| 9,622,834 B2 | 4/2017 | Chapoulaud et al. |
| 9,792,413 B2 | 10/2017 | Badawi |
| 9,844,424 B2 | 12/2017 | Wu et al. |
| 9,872,745 B2 | 1/2018 | Fisker et al. |
| 10,011,050 B2 | 7/2018 | Kitching et al. |
| 10,076,389 B2 | 9/2018 | Wu et al. |
| 10,307,222 B2 | 6/2019 | Morton et al. |
| 10,332,164 B2 | 6/2019 | Abolfathi et al. |
| 10,383,704 B2 | 8/2019 | Kitching |
| 10,405,947 B1 | 9/2019 | Kaza et al. |
| 10,405,951 B1 | 9/2019 | Kopelman et al. |
| 10,413,385 B2 | 9/2019 | Sherwood et al. |
| 10,433,934 B2 | 10/2019 | Kopelman |
| 10,463,452 B2 | 11/2019 | Matov et al. |
| 10,470,846 B2 | 11/2019 | Kopelman et al. |
| 10,524,880 B2 | 1/2020 | Wen |
| 10,553,309 B2 | 2/2020 | Trosien et al. |
| 10,561,476 B2 | 2/2020 | Matov et al. |
| 10,595,965 B2 | 3/2020 | Khardekar et al. |
| 10,617,489 B2 | 4/2020 | Grove et al. |
| 10,650,517 B2 | 5/2020 | Parpara et al. |
| 10,653,503 B2 | 5/2020 | Boltunov et al. |
| 10,783,629 B2 | 9/2020 | Parpara et al. |
| 10,792,127 B2 | 10/2020 | Kopelman et al. |
| 10,813,721 B2 | 10/2020 | Sterental et al. |
| 2005/0019732 A1 | 1/2005 | Kaufmann et al. |
| 2005/0244791 A1 | 11/2005 | Davis et al. |
| 2013/0095446 A1 | 4/2013 | Andreiko et al. |
| 2014/0067334 A1 | 3/2014 | Kuo |
| 2014/0288894 A1 | 9/2014 | Chishti et al. |
| 2016/0302885 A1 | 10/2016 | Matov et al. |
| 2017/0035536 A1 | 2/2017 | Alvarez Garcia et al. |
| 2017/0079748 A1 | 3/2017 | Andreiko |
| 2017/0100214 A1 | 4/2017 | Wen et al. |
| 2017/0178327 A1* | 6/2017 | Somasundaram ... A61B 5/4547 |
| 2017/0340414 A1 | 11/2017 | Janzadeh et al. |
| 2018/0031721 A1* | 2/2018 | Etiene Queiroz ....... G06T 17/05 |
| 2018/0039755 A1 | 2/2018 | Matov et al. |
| 2018/0165818 A1 | 6/2018 | Tsai et al. |
| 2018/0304497 A1 | 10/2018 | Kitching et al. |
| 2018/0344430 A1 | 12/2018 | Salah |
| 2019/0000592 A1 | 1/2019 | Cam et al. |
| 2019/0008446 A1 | 1/2019 | Cunliffe et al. |
| 2019/0046295 A1 | 2/2019 | Morton et al. |
| 2019/0060036 A1 | 2/2019 | Fisker et al. |
| 2019/0282333 A1 | 9/2019 | Matov et al. |
| 2019/0314117 A1 | 10/2019 | Morton et al. |
| 2019/0357997 A1 | 11/2019 | Shi et al. |
| 2020/0000551 A1 | 1/2020 | Li et al. |
| 2020/0000552 A1 | 1/2020 | Mednikov et al. |
| 2020/0085535 A1* | 3/2020 | Pokotilov ............... A61C 7/002 |
| 2020/0146776 A1 | 5/2020 | Matov et al. |
| 2020/0229900 A1 | 7/2020 | Cunliffe et al. |
| 2020/0297459 A1 | 9/2020 | Grove et al. |
| 2020/0306012 A1 | 10/2020 | Roschin et al. |

FOREIGN PATENT DOCUMENTS

| | | |
|---|---|---|
| CN | 106504329 A | 3/2017 |
| WO | 98058596 A1 | 12/1998 |
| WO | 00019928 A1 | 4/2000 |

(56) References Cited

FOREIGN PATENT DOCUMENTS

| WO | 00019930 A1 | 4/2000 |
| WO | 00019931 A1 | 4/2000 |
| WO | 00069356 A1 | 11/2000 |
| WO | 00069357 A1 | 11/2000 |
| WO | 01074268 A1 | 11/2001 |
| WO | 2018085718 A2 | 5/2018 |
| WO | 2019089989 A2 | 5/2019 |

OTHER PUBLICATIONS

Extended European Search Report completed on May 5, 2021 issued in respect of the counterpart European Patent Application No. 20212042.4.

Yuan, "Research on gum tissue deformation simulation techniques", https://www.researchgate.net/publication/286279942_Research_on_gum_tissue_deformation_simulation_techniques, retrieved on Jan. 27, 2020.

\* cited by examiner

METHOD OF DETERMINING DEFORMATION OF GINGIVA

CROSS-REFERENCE

The present application is a continuation of U.S. patent application Ser. No. 16/793,468 filed Feb. 18, 2020, the entirety of which is incorporated by reference.

FIELD

The present technology relates to determining deformation of gingiva surrounding one or more displaced teeth, and more specifically to a computer-implementable method of determining deformation of gingiva.

BACKGROUND

An orthodontic treatment plan may be created for a patient. The movement of the patient's teeth based on an applied orthodontic treatment may be modelled as part of the creation of the treatment plan. The modelling may be based on images of the patient's teeth. The images may have been obtained using an intraoral scanner. The modeling may indicate an interaction of teeth and jaw bones. Movement of the soft tissue may also produce effects on the movement of the teeth during an orthodontic treatment. It may be beneficial to effectively model tissue response to tooth movement.

An operator may attempt to predict the deformation of the gingiva that will occur when the orthodontic treatment is applied. A final model of the gingiva may be constructed based on the intended final location of the teeth, and a function may then compare the original position of the gingiva and the final model of the gingiva to extrapolate a prediction of the gingival shift.

These predictions might not accurately predict the actual deformation that will occur.

SUMMARY

It is an object of the present technology to ameliorate at least some of the inconveniences present in the prior art.

Embodiments of the present technology have been developed based on developers' appreciation that determining how a gingiva will deform when teeth are shifted may be beneficial to users.

Embodiments of the present technology have been developed based on developers' appreciation that predicting how the gingiva will deform based on node weights may be more accurate than manually predicted gingiva deformation or other automated methods of predicting gingiva deformation.

Contrary to teeth and bones, gingiva and other soft tissues do not move as a solid body. When simulating movement of a tooth, an entire mesh representing a tooth can undergo the same linear translation of coordinates in order to represent the movement of the tooth. For soft tissue, on the other hand, a portion of the tissue in contact with a tooth being moved will move with the tooth, while surrounding tissues will move to different degrees and will generally deform (one or more of: stretching, compressing, and/or twisting). Thus, a different method of calculating movement of the soft tissues may be used to arrive at realistic models of gingiva movement and deformation due to tooth movement.

In order to model movement of the gingiva due to tooth movement, points along the gingiva/tooth interface may be assumed to move together with the tooth (the gum tissue holds onto the tooth). The points between the interface (which has moved) and the surrounding gingiva (which has not moved yet) then form an abrupt interface. As this is not a physical response, the present solution then smooths the abrupt interface using a variety of techniques, including solving a harmonic equation relating the surface from the shifted interface over the mesh representing the surrounding gingiva prior to movement.

A simulation of the treatment plan may be performed to determine the movement of soft tissue surrounding the teeth and bones due to progressive movement of the teeth throughout the treatment plan. The movement of the soft tissue may be modeled by smoothing the movement gradually over the surface of the gingiva. A harmonic equation representing the value of the deformation throughout the surface of the mesh may be solved to model the movement of the soft tissue.

According to one aspect, there is provided a method of determining deformation of gingiva, the method being executable by an electronic device, the method comprising: receiving a three-dimensional (3D) digital model of an archform comprising a representation of the gingiva and at least one tooth, the 3D model comprising a 3D mesh describing a surface of the gingiva and the at least one tooth, the 3D mesh comprising a plurality of vertices connected to one another other by edges; separating the 3D mesh into: a gingiva mesh describing a surface form of the gingiva, and a tooth mesh describing a surface form of the at least one tooth; identifying a set of shared vertices defining a contour between the gingiva mesh and the tooth mesh, the set of shared vertices being included in both the gingiva mesh and the tooth mesh; applying a tooth-movement displacement to the tooth mesh representing displacement of the at least one tooth, each vertex of the tooth mesh being displaced by a same vector to represent rigid movement of the at least one tooth; applying the tooth-movement displacement to vertices of the gingiva mesh belonging to the set of shared vertices; determining a vertex-specific displacement for each remaining vertex of the gingiva mesh not belonging to the set of shared vertices by solving a harmonic equation describing a smooth surface of the gingiva mesh, a boundary condition of the harmonic equation being linked to the displacement of the vertices of the gingiva mesh belonging to the set of shared vertices; and updating the 3D model by applying the vertex-specific displacement to each corresponding remaining vertex of the gingiva mesh.

In certain embodiments, the method further comprises creating a revised gingiva mesh by redistributing vertex positions and edge lengths of the gingiva mesh.

In certain embodiments, creating the revised gingiva mesh comprises: calculating edge length of each of the edges of the gingiva mesh; and initiating an iterative remeshing algorithm to adapt mesh regions until a length of each of the edges of the gingiva mesh is greater than a predetermined threshold length.

In certain embodiments, the method further comprises using the revised gingiva mesh to generate an on-screen representation of an updated 3D model of the archform after the tooth-movement displacement.

In certain embodiments, the vertex-specific displacement of a given vertex models deformation of a corresponding point on the surface form of the gingiva.

In certain embodiments, the method further comprises building a mesh matrix representing mesh connectivity prior to solving the harmonic equation over the gingiva mesh.

In certain embodiments, the method further comprises utilizing parallel processing for the solving the harmonic equation describing the smooth surface of the gingiva mesh, the electronic device including a parallel processing unit.

In certain embodiments, the boundary condition linked to the displacement of the vertices of the gingiva mesh belonging to the set of shared vertices is simulated as a Dirichlet boundary condition where a function of displacement for vertices of the gingiva mesh of the set of shared vertices is prescribed by the tooth-movement displacement.

In certain embodiments, the displacement describes at least a rotation of the at least one tooth.

In certain embodiments, the displacement describes at least a tilting motion of the at least one tooth.

In certain embodiments, the solving the harmonic equation describing the smooth surface of the gingiva mesh comprises solving a Laplacian equation.

According to another aspect, there is provided an apparatus comprising: at least one processor; and a memory device comprising executable instructions, which, when executed by the at least one processor, cause the apparatus to: receive a three-dimensional (3D) digital model of an archform comprising a representation of the gingiva and at least one tooth, the 3D model comprising a 3D mesh describing a surface of the gingiva and the at least one tooth, the 3D mesh comprising a plurality of vertices connected to one another other by edges; separate the 3D mesh into: a gingiva mesh describing a surface form of the gingiva, and a tooth mesh describing a surface form of the at least one tooth; identify a set of shared vertices defining a contour between the gingiva mesh and the tooth mesh, the set of shared vertices being included in both gingiva mesh and the tooth mesh; apply a tooth-movement displacement to the tooth mesh representing displacement of the at least one tooth, each vertex of the tooth mesh being displaced by a same vector to represent rigid movement of at least one tooth; apply the tooth-movement displacement to vertices of the gingiva mesh belonging to the set of shared vertices; determine a vertex-specific displacement for each remaining vertex of the gingiva mesh not belonging to the set of shared vertices by solving a harmonic equation describing a smooth surface of the gingiva mesh, a boundary condition of the harmonic equation being linked to the displacement of the vertices of the gingiva mesh belonging to the set of shared vertices; and update the 3D model by applying the vertex-specific displacement to each corresponding remaining vertex of the gingiva mesh.

In certain embodiments, the at least one processor is configured to execute parallel processing.

In certain embodiments, the at least one processor comprises at least one graphics processing unit (GPU) to perform the solving the harmonic equation through parallel processing.

According to another aspect, there is provided a method of determining deformation of gingiva, the method being executable by an electronic device, the method comprising: receiving a three-dimensional (3D) digital model of an archform comprising a representation of the gingiva and a plurality of teeth, the 3D model comprising a 3D mesh describing a surface of the gingiva and the plurality of teeth, the 3D mesh comprising a plurality of vertices connected to one another other by edges; identifying contour vertices defining a contour between a gingiva mesh describing portions of the 3D mesh corresponding to the gingiva and portions of the 3D mesh corresponding to a given tooth of the plurality of teeth; assigning, to the given tooth, a node representing a position of the given tooth; assigning a vertex weight equal to 1.0 to the contour vertices and to each vertex of the portions of the 3D mesh corresponding to the given tooth; determining a vertex weight, corresponding to the given tooth, for each remaining vertex of the gingiva mesh not belonging to the contour vertices by solving a harmonic equation describing a smooth gradation of vertex weights of the gingiva mesh, a boundary condition of the harmonic equation being linked to the vertex weight equal to 1.0 of the contour vertices, the vertex weight being representative of influence of movement of the node of the given tooth on a corresponding vertex of the gingiva mesh; applying a tooth-movement displacement to the node of the given tooth; determining a vertex-specific displacement for each vertex of the 3D mesh based on the vertex weight specific to each vertex of the 3D mesh and the tooth-movement displacement of the node; and updating the 3D model by applying the vertex-specific displacement to each corresponding vertex of the 3D mesh.

In certain embodiments, the given tooth is a first tooth, the contour vertices belong to a first set of contour vertices, and the node is a first node; and wherein the method further comprises: identifying a second set of contour vertices defining at least one additional contour between the gingiva mesh and portions of the 3D mesh corresponding to a second tooth of the plurality of teeth; assigning, to the second tooth, a second node representing a position of the second tooth; assigning a vertex weight equal to 1.0 to each vertex of the second set of contour vertices and to each vertex of the portions of the 3D mesh corresponding to the second tooth; determining a vertex weight, corresponding to the second tooth, for each remaining vertex of the gingiva mesh not belonging to the second set of contour vertices by solving an other harmonic equation describing a smooth gradation of vertex weights of the gingiva mesh, a boundary condition of the harmonic equation being linked to the vertex weight equal to 1.0 of the second set of contour vertices.

In certain embodiments, the method further comprises applying an additional tooth-movement displacement to the second node; determining an additional vertex-specific displacement for each vertex of the 3D mesh based on the vertex weight corresponding to the second tooth of each vertex of the 3D mesh; and updating the 3D model by applying the additional vertex-specific displacement to each corresponding vertex of the 3D mesh.

In certain embodiments, the method further comprises creating a revised 3D mesh by redistributing vertex positions and edge lengths of at least a portion of the 3D mesh.

In certain embodiments, creating the revised 3D mesh comprises: calculating an edge length of each of the edges of the at least the portion of the 3D mesh; and initiating an iterative remeshing algorithm to adapt mesh regions until a length of each of the edges of the at least the portion of the 3D mesh is greater than a predetermined threshold length.

In certain embodiments, parallel processing is utilized for the solving the harmonic equation, the electronic device including a parallel processing unit.

In certain embodiments, the boundary condition is simulated as a Dirichlet boundary condition where a function of vertex of contour vertices is set to be equal to 1.0.

In certain embodiments, the tooth-movement displacement of the node describes at least a rotation of the given tooth.

In certain embodiments, the tooth-movement displacement of the node describes at least a tilting motion of the given tooth.

According to another aspect, there is provided an apparatus comprising: at least one processor; and a memory device comprising executable instructions, which, when executed by the at least one processor, cause the apparatus to: receive a three-dimensional (3D) digital model of an archform comprising a representation of the gingiva and a plurality of teeth, the 3D model comprising a 3D mesh describing a surface of the gingiva and the plurality of teeth, the 3D mesh comprising a plurality of vertices connected to one another other by edges; identify contour vertices defining a contour between a gingiva mesh describing portions of the 3D mesh corresponding to the gingiva and portions of the 3D mesh corresponding to a given tooth of the plurality of teeth; assign, to the given tooth, a node representing a position of the given tooth; assign a vertex weight equal to 1.0 to the contour vertices and to each vertex of the portions of the 3D mesh corresponding to the given tooth; determine a vertex weight, corresponding to the given tooth, for each remaining vertex of the gingiva mesh not belonging to the contour vertices by solving a harmonic equation describing a smooth gradation of vertex weights of the gingiva mesh, a boundary condition of the harmonic equation being linked to the vertex weight equal to 1.0 of the contour vertices, the vertex weight being representative of influence of movement of the node of the given tooth on a corresponding vertex of the gingiva mesh; apply a tooth-movement displacement to the node of the given tooth; determine a vertex-specific displacement for each vertex of the 3D mesh based on the vertex weight specific to each vertex of the 3D mesh and the tooth-movement displacement of the node; and update the 3D model by applying the vertex-specific displacement to each corresponding vertex of the 3D mesh.

The methods, systems, and apparatuses described herein may reduce the amount of time and/or computing resources used to determine gingiva deformations that occur when one or more teeth shift. The methods, systems, and apparatuses described herein may more accurately predict gingiva deformation than a manually-determined gingiva deformation. Vertex-specific node weights may be determined for and assigned to all or a portion of the vertices in a mesh. The node weights may be used to determine the gingiva deformation. A harmonic equation may be solved to determine the gingiva deformation. The determined gingiva deformation may be used when creating various orthodontic appliances, and a more accurate predicted deformation may lead to more effective orthodontic appliances.

In the context of the present specification, unless expressly provided otherwise, a computer system may refer, but is not limited to, an "electronic device," an "operation system," a "system," a "computer-based system," a "computer-implemented system", a "computer-implemented apparatus", a "controller unit," a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object might not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

When a tooth is shifted, such as by an orthodontic appliance, the gingiva surrounding the tooth may also shift. This shift in the gingiva is referred to herein as the gingiva deformation. The way that the gingiva will be deformed in response to a tooth being shifted may be difficult to predict and/or model. Portions of the gingiva that are closer to the tooth may be deformed to a greater degree than portions of the gingiva that are further away from the tooth. In order to determine the efficacy of a proposed orthodontic treatment, an operator may wish to determine the gingiva deformation that will occur if the treatment is applied and/or view a model of the predicted changes to the teeth and gingiva after applying the treatment.

A digital model (hereinafter referred to as a "model") of a patient's archform may be generated based on images and/or scans of the patient's mouth, such as images and/or scans of the teeth and gingiva of the patient. The model generally includes teeth and gingiva. The model may comprise a three dimensional (3D) mesh, in which a plurality of vertices are connected to each other by edges.

The model may be analyzed to identify various portions of the archform. Boundaries between teeth and gingiva may be determined. Boundaries between teeth and teeth may be determined. Each tooth in the archform may be identified. Each identified tooth may be associated with a node indicating a location of the tooth. When a tooth is shifted, such as when the tooth moves, tilts, or is rotated, the gingiva will be deformed. A vector may be received indicating a shift to a node. The vector may indicate a movement of the tooth associated with the node and/or a rotation of the tooth associated with the node. Each vertex in the archform that forms the tooth may be shifted by the vector. Each vertex in the archform that forms the boundary between the tooth and gingiva may be shifted by the vector. For each other vertex in the archform, i.e. the vertices that correspond solely to the gingiva, a vector for shifting each vertex may be determined based on the distance between the respective vertex and the tooth.

Figure 1:
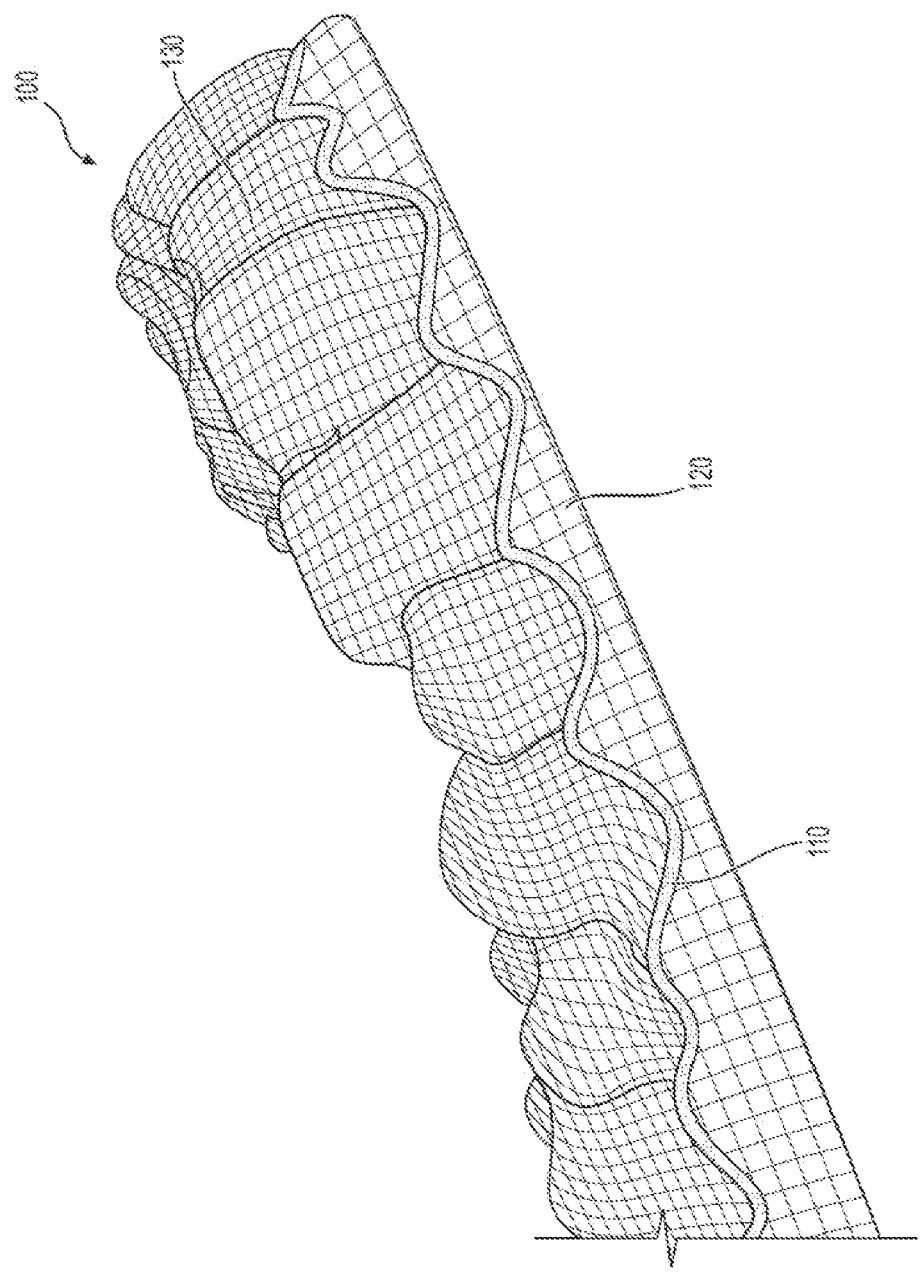
FIG. 1 shows an example of an archform mesh according to non-limiting embodiments of the present technology.

FIG. 1 shows an example of an archform mesh 100 according to one or more illustrative aspects of the disclosure. The archform mesh 100 is composed of vertices which are connected by edges. The archform mesh 100 represents the gingiva 120 and teeth 130 of a patient. Although the archform mesh 100 illustrates the lower part of the patient's mouth ("lower arch"), it should be understood that an archform mesh 100 may comprise a lower and/or upper portion of the patient's mouth.

A boundary 110 separates the gingiva 120 from the teeth 130. The boundary 110 may be representative of a gumline of the patient's archform. The boundary 110 may be manually identified, or drawn, by a user viewing the archform mesh 100. The boundary 110 may be determined automatically using various methods, such as those described in U.S. patent application Ser. No. 16/703,471, which is incorporated herein by reference in its entirety. The archform mesh 100 may be generated based on one or more images, scans, and/or other collected data regarding a patient's mouth. The archform mesh 100 may also be generated based on a physical mold representing the patient's teeth and gingiva.

When an orthodontic treatment is applied to the patient's mouth, such as by using an orthodontic appliance, one or more of the teeth 130 may shift. Because of the shift in the teeth 130, all or a portion of the gingiva 120 may deform.

Figure 2:
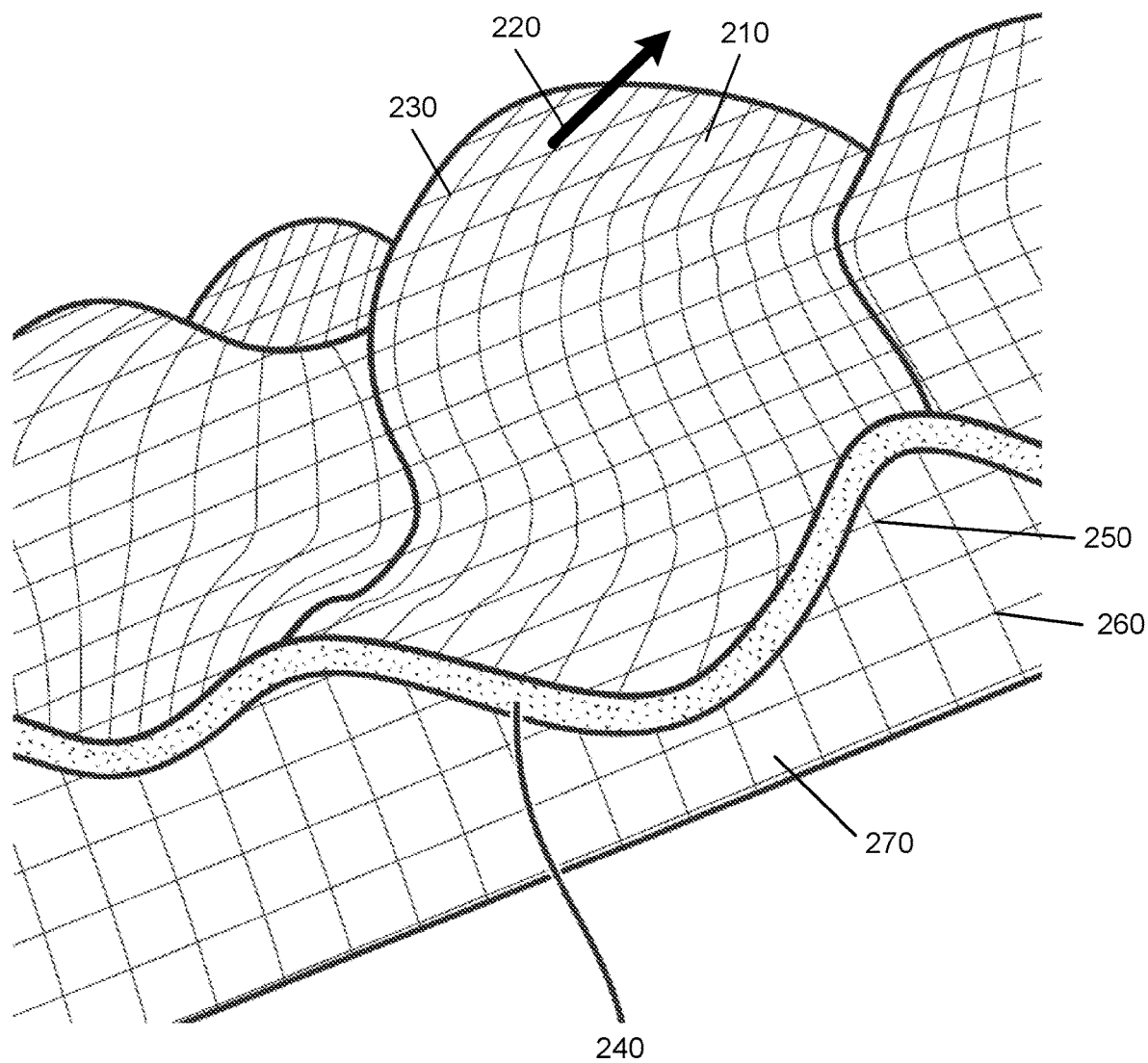
FIG. 2 shows an example of vertices that can be shifted on an archform mesh according to non-limiting embodiments of the present technology.

FIG. 2 shows an example of vertices that can be shifted on an archform mesh according to non-limiting embodiments of the present technology. In the example illustrated in FIG. 2, a tooth 210 is being shifted according to a vector 220. The vector 220 may model a predicted shift in the tooth 210 if a proposed orthodontic treatment were applied. In order to model the shift and gingival deformation that will occur in response to the vector 220 being applied to the tooth 210, each vertex that forms the tooth 210, such as the vertex 230, will be shifted by the vector 220. Additionally, each vertex in the boundary 240 between the gingiva 270 and the tooth 210 will be shifted by the vector 220.

The gingival deformation will be represented by the shifts in the vertices that form the gingiva 270, such as the vertices 250 and 260. To model the gingival deformation, the vertices 250 and 260 may be shifted by vectors having a smaller magnitude than the vector 220. Because the vertex 260 is further from the tooth 210 than the vertex 250, the magnitude of the vector applied to the vertex 260 may be smaller than the magnitude of the vector applied to the vertex 250.

The vertices 230, 250, and/or 260 may each be assigned one or more node weights. Each node weight may indicate a tooth and a numerical weight value. The weight value may be applied to the vector 220 to determine how much to shift each vertex. Because the vertex 230 is part of the tooth 210, the vertex 230 may be assigned a node weight of 1.0. A node weight of 1.0 may indicate that the vector 220 should be applied to the vertex 230 without any changes to the magnitude of the vector 220.

The vertex 250 may be assigned a node weight that is less than 1.0 for the tooth 210. Because the vertex 250 is located on the gingiva, the magnitude of the vector 220 may be reduced before being applied to the vertex 250. Similarly, the vertex 260 may be assigned a node weight that is less than the node weight of the vertex 250. Because the vertex 260 is further away from the tooth 210 than the vertex 250, the tooth 210 may have less influence on the vertex 260 than on the vertex 250. To represent this lower influence, the vertex 260 may have a lower node weight than the vertex 250. The method 300, described below, illustrates an exemplary method of determining node weights for the vertices 230, 250, and 260.

Figure 3:
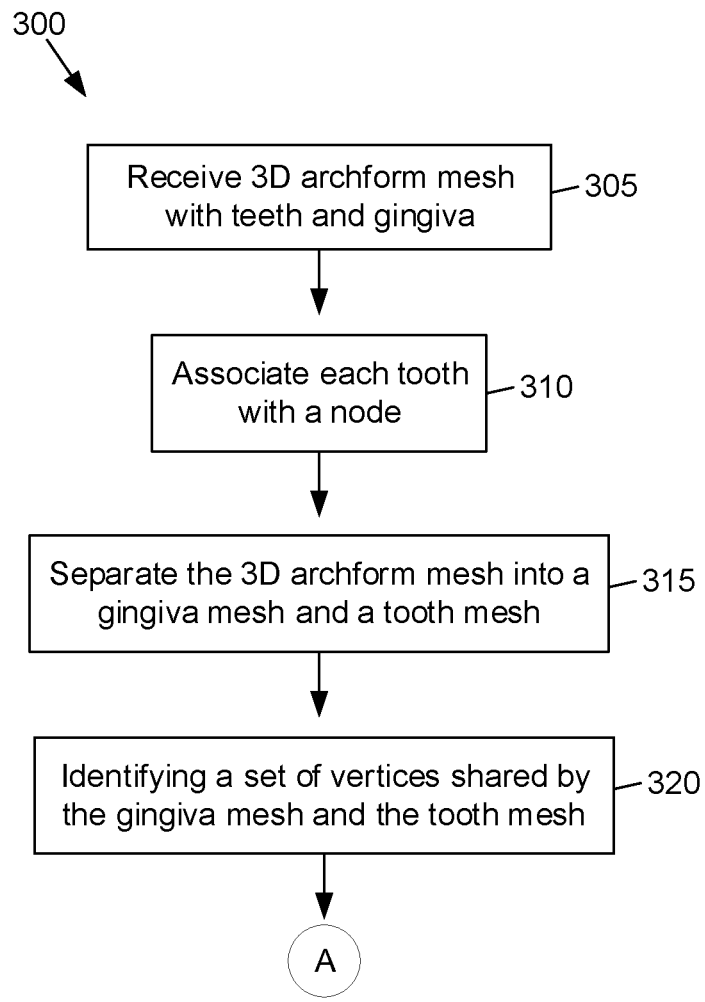
FIGS. 3-5 are flow diagrams of a method for determining deformation of gingiva according to non-limiting embodiments of the present technology.
Figure 4:
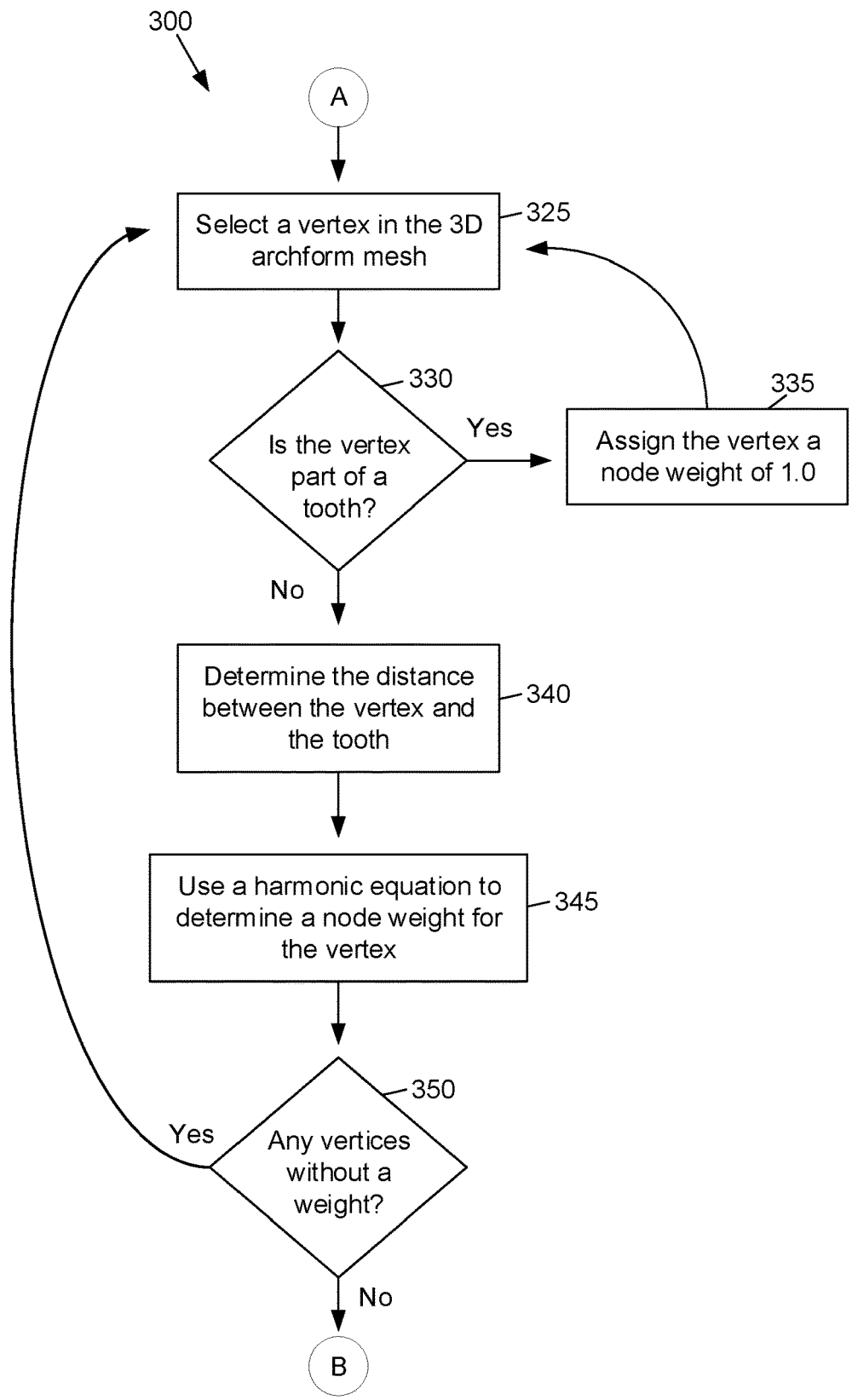
Figure 5:
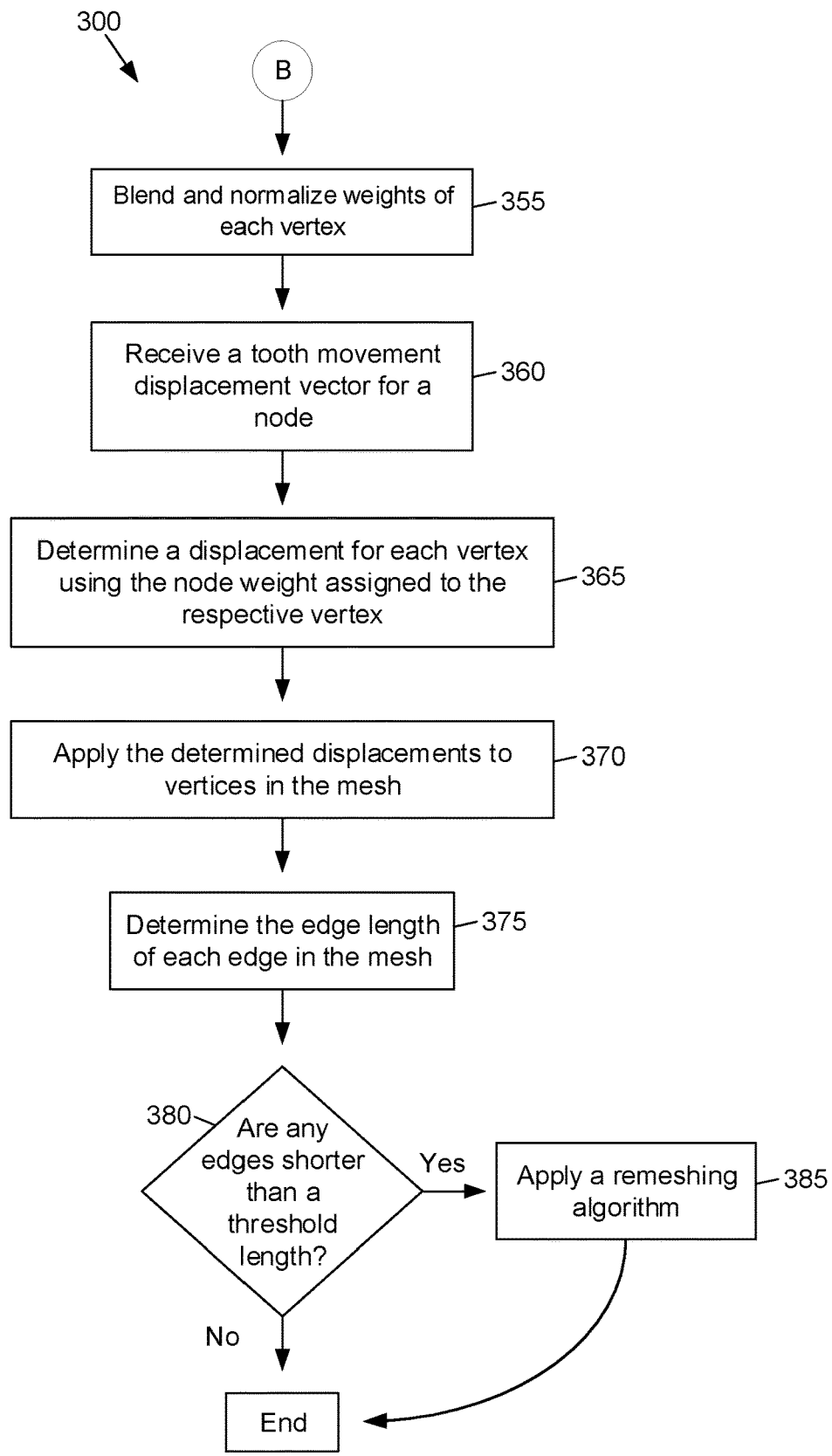

FIGS. 3-5 are flow diagrams of a method 300 for determining deformation of gingiva according to non-limiting embodiments of the present technology.

At step 305 a 3D archform mesh with teeth and gingiva may be received, such as the archform mesh 100. The 3D archform mesh may comprise vertices and edges connecting the vertices, where each edge connects to two vertices. The vertices and edges may represent a plurality of teeth and gingiva. The 3D archform mesh may comprise an upper and/or lower set of teeth and gingiva.

At step 310 each tooth in the 3D archform mesh may be associated with a node. Each tooth may be selected by an operator and/or automatically identified. The node may be a vertex or any other location in the 3D archform mesh. The node may be located anywhere on the tooth, such as in a center of the tooth. The location may be determined by finding an average or median location on the tooth. The node may correspond to a bone connected to the tooth.

At step 315 the 3D archform mesh may be separated into a gingiva mesh and a tooth mesh. The gingiva mesh and the tooth mesh may share a set of vertices. Each vertex in the mesh may be labelled as corresponding to either a tooth, gingiva, or both. The gingiva mesh may describe a surface form of the gingiva. The tooth mesh may describe a surface form of the teeth.

The mesh may be manually separated by an operator selecting a boundary between the gingiva and each tooth. After the operator selects the boundary, all vertices on one side of the boundary may be labelled as corresponding to gingiva, all vertices on the other side of the boundary may be labelled as corresponding to teeth, and all vertices on the boundary may be labelled as corresponding to both. The mesh may be separated automatically, such as by a module that determines the boundary between the gingiva and the teeth. The mesh may first be separated automatically and then displayed to an operator who may manually confirm and/or adjust the boundary between the meshes.

At step 320 a set of vertices shared by the gingiva mesh and the tooth mesh may be identified. The set of shared vertices may define a contour between the gingiva mesh and the tooth mesh. The vertices in the set of shared vertices may be included in both the gingiva mesh and the tooth mesh. The set of vertices shared by the gingiva mesh and the tooth mesh may be vertices located on the boundary between the teeth and gingiva. The set of vertices may be determined by comparing the tooth mesh to the gingiva mesh and identifying shared vertices. The set of vertices may be determined by identifying vertices that were labelled as corresponding to both teeth and gingiva.

At step 325 a vertex in the 3D archform mesh may be selected. The vertices may be selected in any order. All or a portion of steps 325-50 may be executed in parallel, in which case multiple vertices may be selected at step 325.

At step 330 a determination may be made as to whether the vertex selected at step 325 forms part of a tooth. A determination may be made as to whether the vertex is part of the archform mesh corresponding to the teeth. If the vertices were labeled, the label for the selected vertex may be examined to determine whether the vertex is labelled as corresponding to a tooth. Vertices in the set of shared vertices may be determined to be part of the tooth at step 330.

If the vertex selected at step 325 corresponds to a tooth and/or the boundary between the tooth and gingiva, the vertex may be assigned a node weight indicating that the vertex will be shifted in the same manner as the entire tooth. In other words, a vector corresponding to the shift of the tooth will be applied directly to this vertex. The node weight may be set to '1.0,' which indicates that a vector indicating movement of the node should not be scaled (reduced) when applied to this vertex.

If the vertex selected at step 325 does not correspond to a tooth, the vertex is assumed to be part of the gingiva. At step 340 a distance between the vertex and the tooth may be determined. Various methods may be used for calculating the distance. A vertex that is part of the tooth and that is the nearest vertex to the vertex selected at step 325 may be identified. The distance may be calculated as the distance between the vertex selected at step 325 and that nearest vertex on the tooth. A location on an edge corresponding to the tooth that is the nearest location to the vertex may be determined. The distance may be calculated as the distance between the vertex and that nearest location on the edge. The distance may be calculated as a distance between the vertex and the node corresponding to the tooth.

At step 345 a node weight may be determined and assigned to the vertex. The node weight may indicate a node, i.e. a tooth, corresponding to the node weight. An index corresponding to the node may be stored with the node weight. A local position of the vertex with respect to the node may be determined. The local position may be stored with the node weight. The node weight may be determined based on the distance from the vertex to the tooth determined at step 340.

Multiple node weights may be assigned to an individual vertex, each corresponding to a different node. If a vertex is located between two teeth the vertex may have a first node weight corresponding to the first tooth and a second node weight corresponding to the second tooth. A threshold distance may be used to determine whether a vertex is to be assigned a node weight corresponding to a tooth. If the vertex is within the threshold distance from a tooth, the vertex may be assigned a node weight corresponding to the tooth.

A relaxation technique may be used to assign and/or smooth the distribution of node weights among the vertices. The node weights assigned to vertices may gradually decrease as the distance of the vertices from the tooth increase. Various functions and/or algorithms may be used to assign the node weights. A harmonic function solver may be used to assign the node weights to the vertices.

At step 350 a determination may be made as to whether all vertices have been assigned a node weight. If there are any vertices remaining that have not been assigned a node weight, a next vertex may be selected at step 325. The next vertex selected at step 325 may be a node that has not been assigned a node weight.

If a determination is made at step 350 that all vertices have been assigned node weights, the method 300 may proceed to step 355. Some vertices might not be assigned node weights, such as vertices that are further than a predetermined distance from any tooth. The method 300 may continue to step 355 after those vertices have been traversed, even though those vertices were not assigned a node weight.

At step 355 the node weights assigned to each of the vertices may be blended and/or normalized. The node weights may be normalized to fit within a predetermined range. All node weights may be normalized to range from 0.0 to 1.0, or any other predetermined range. A mesh matrix representing mesh connectivity may be constructed. The mesh matrix may indicate which vertices are connected to which triangles and/or what areas are surrounding each vertex. The mesh matrix may be a diagonal matrix. The mesh matrix may be used to perform calculations for smoothing the node weights across the vertices.

A harmonic function may be used to smooth the node weights across the vertices. A harmonic equation describing a smooth surface of the gingiva mesh may be solved to determine the node weights. The harmonic equation may be a Laplacian equation. Parallel processing may be used to solve the harmonic equation, such as by using a parallel processing unit.

A boundary condition of the harmonic equation may be linked to the displacement of the vertices shared by the gingiva mesh and tooth mesh. The boundary condition may be simulated as a Dirichlet boundary condition where a function of displacement for vertices of the gingiva mesh of the set of shared vertices is prescribed by the tooth-movement displacement. The node weights may be smoothed so that they have gradually decreasing values as the distance of the vertices from the node increases.

At step 360 a tooth movement displacement vector for a node may be received. The tooth movement displacement vector may indicate a lateral movement of the tooth, rotation of tooth, and/or a tilting motion of the tooth. The vector may indicate a direction of movement and/or a distance of the movement. The vector may indicate a direction of rotation and/or an amount of rotation. The amount of rotation, tilting, and/or distance of the movement may be represented by the magnitude of the vector.

Although described as a vector, an indicator of movement and/or rotation may be received in any other suitable format. For example rather than receiving a vector, a final position of a node may be received. A vector may then be determined by comparing the original location of the node to the final location of the node.

At step 365 a displacement may be determined for each vertex corresponding to the node that is subject to a vector received at step 355. A set of vertices corresponding to the node may be identified in the tooth mesh and/or the gingiva mesh. The node weights assigned to each of the vertices may be used to determine which vertices correspond to the node. All vertices may be identified that have a node weight associated with the node being displaced.

The node weights corresponding to the node may be used to calculate the displacement for each vertex. The vector may be applied directly to the vertices in the tooth mesh that form the tooth, without scaling the vector. Each vertex of the tooth corresponding to the node will be displaced by the vector to represent rigid movement of the tooth. The vector might also be applied directly to the vertices that are shared by the gingiva mesh and the tooth mesh.

For the other vertices in the gingiva mesh, the vector may be scaled before being applied to those vertices. In other words, the magnitude of the vector may be reduced before the vector is applied to each of the vertices on the gingiva. A vertex-specific displacement may be determined for each of the vertices. In order to scale the vector for a vertex, the node weight of the vertex may be multiplied by the magnitude of the vector. A vertex-specific vector may be generated having the calculated magnitude.

The vertex-specific vector may have the same direction as the tooth movement displacement vector. The vertex-specific vector may have a direction that is determined based on the direction of the tooth movement displacement vector. For each vertex, the direction of the respective vertex-specific vector may be calculated by combining the vertex-specific vectors of a set of vertices connected to the teeth on the same jaw (upper or lower) as the vertex. The vertices forming the set of vertices may be selected based on a pre-determined threshold distance from the vertex. All vertices less than the threshold distance from the vertex may be selected for the set of vertices.

Various smoothing and/or blending functions may be used to determine the displacement for each vertex. The vector may be applied directly to each of the vertices corresponding to the node resulting in a new position for each of the vertices. The node weight may then be used to determine a blended position for each vertex. The resulting positions may represent an approximation of the gingival deformation caused by the motion of the tooth as indicated by the tooth movement displacement vector.

Although described as a single tooth movement displacement vector being received at step 360, in some instances multiple tooth movement displacement vectors may be received, in order to simulate the movement of multiple teeth. When multiple tooth movement displacement vectors are received, new locations may be determined for each vertex based on the tooth movement displacement vectors, such as by applying the displacement vectors to each vertex corresponding to the respective node. A blending function may be applied to the determined positions thereby generating a blended position for each vertex.

At step 370 the displacements determined at step 365 may be applied to each of the affected vertices in the mesh. A new location may be calculated for each vertex that a vertex-specific vector was generated for. The 3D mesh may be updated with the vertex-specific displacements to each vertex.

At step 375 an edge length may be determined for each edge in the updated mesh. The edge length may be determined by calculating a distance between each of the vertices that are connected by edges.

At step 380 a determination may be made as to whether any of the edge lengths are shorter than a predetermined threshold length. The threshold length may be determined based on the capabilities of a manufacturer of orthodontic appliances, such as based on the resolution of a three dimensional (3D) printer. In some instances a tolerance threshold range comprising a minimum and maximum edge length may be provided instead of the threshold length. If a tolerance threshold range is provided, at step 380 a determination may be made as to whether all edge lengths are within the tolerance threshold range.

If any edges are shorter than the threshold length, at step 385 a remeshing algorithm may be applied to the mesh. The remeshing algorithm may redistribute the vertex positions and edge lengths of the gingiva mesh. The remeshing algorithm may remove edges smaller than the threshold, such as by removing vertices attached to the edges. The remeshing algorithm may be an iterative algorithm that alters the topology of all mesh regions until the length of each of the edges is above the threshold length, or within the tolerance threshold range.

By removing smaller edges, the resulting mesh may lead to a more numerically stable solution of the Laplace equation and/or the size of the mesh may be reduced. calculations based on the mesh may be executed more efficiently when the size of the mesh is reduced.

After applying the remeshing algorithm at step 385, or if at step 380 all edges were determined to be longer than the threshold length, the method 300 may end. An updated mesh with the predicted gingival deformation may be output. The updated mesh may be used to generate an on-screen representation of the archform after applying the tooth-movement displacement. The on-screen representation may enable an operator, such as a doctor, to determine a treatment efficacy associated with the tooth-movement displacement.

The method 300, or one or more steps thereof, may be embodied in computer-executable instructions that are stored in a computer-readable medium, such as a non-transitory computer-readable medium. The method 300, or one or more steps thereof, may be performed by one or more computing devices or entities, such as the computing device 600 described below and in FIG. 6.

Figure 6:
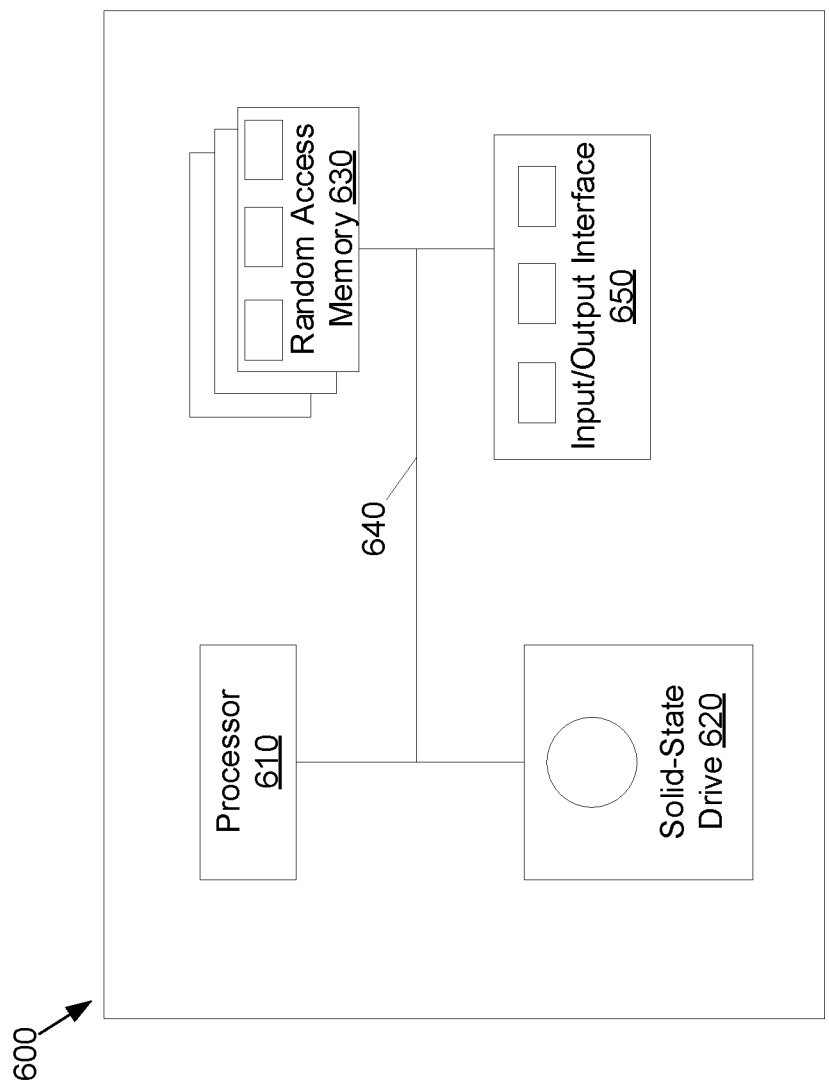
FIG. 6 is an example computing device that may be used to implement any of the methods described herein.

FIG. 6 is an example computing device 600 that may be used to implement any of the methods described herein. The computing device 600 comprises various hardware components including one or more single and/or multi-core processors collectively represented by a processor 610, a solid-state drive 620, a random access memory 630 and an input/output interface 650. The processor 610 may comprise a parallel processing unit. Communication between the various components of the computing device 600 may be enabled by one or more internal and/or external buses 640 (e.g. a PCI bus, universal serial bus, IEEE 1394 "Firewire" bus, SCSI bus, Serial-ATA bus, ARINC bus, etc.), to which the various hardware components are electronically coupled.

The random access memory 630 and/or solid-state drive 620 are configured in any known manner and arranged to store, among other data, one or more of: set-up data, subject data, subject medical records of one or more subjects, archform image data of the one or more of the subjects, such as 3D archform meshes, and/or orthodontic treatment data.

The input/output interface 650 allows enabling networking capabilities such as wire or wireless access. As an example, the input/output interface 650 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 650 may implement specific physical layer and data link layer standards such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 620 stores program instructions suitable for being loaded into the random access memory 630 and executed by the processor 610, such as for executing the methods described herein according to certain aspects and embodiments of the present technology. For example, the program instructions may be part of a library or an application.

The computing device 600 may be implemented in a generic computer system which is a conventional computer (i.e. an "off the shelf" generic computer system). The generic computer system may be a desktop computer/personal computer, and/or may be any other type of electronic device such as, but not limited to, a laptop, a mobile device, a smart phone, a tablet device, or a server.

The computing device 600 may be implemented in a device specifically dedicated to the implementation of the present technology. For example, the computing device 600 may be implemented in an electronic device such as, but not limited to, a desktop computer/personal computer, a laptop, a mobile device, a smart phone, a tablet device, a server, specifically designed for managing orthodontic treatment, or for making orthodontic appliances for applying the orthodontic treatment. The electronic device may also be configured to operate other devices, such as one or more imaging devices.

The computing device 600 may be hosted, at least partially, on a server. The computing device 600 may be partially or totally virtualized through a cloud architecture.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting.

What is claimed is:

1. A method of determining deformation of gingiva, the method being executable by an electronic device, the method comprising:
    receiving a three-dimensional (3D) digital model of an archform comprising a representation of the gingiva and a tooth, the 3D digital model comprising a 3D mesh having a plurality of vertices connected to one another other by edges, wherein a first portion of the 3D mesh corresponds to a surface of the gingiva, a second portion of the 3D mesh corresponds to a surface of the tooth, and a third portion of the 3D mesh corresponds to shared vertices defining a contour between the gingiva and the tooth;
    applying a tooth-movement displacement vector to each vertex of the second portion of the 3D mesh, thereby shifting each vertex corresponding to the surface of the tooth by the tooth-movement displacement vector;
    applying the tooth-movement displacement vector to each vertex of the third portion of the 3D mesh, thereby shifting each vertex corresponding to the contour by the tooth-movement displacement vector;
    determining, for each vertex of the first portion of the 3D mesh, a respective vertex-specific displacement based on the tooth-movement displacement vector, wherein the vertex-specific displacement is determined at least in part by solving a harmonic equation,
        a boundary condition of the harmonic equation being linked to displacement of vertices of the third portion of the 3D mesh;
        the boundary condition being simulated as a Dirichlet boundary condition where a function of displacement for the vertices of the third portion of the 3D mesh is prescribed by the tooth-movement displacement vector;
    applying, to each vertex of the first portion of the 3D mesh, the respective vertex-specific displacement, thereby shifting each vertex corresponding to the gingiva; and
    updating the 3D digital model based on the 3D mesh.

2. The method of claim 1, further comprising:
    calculating an edge length of each of the edges of the 3D mesh; and
    adjusting the 3D mesh until a length of each of the edges of the 3D mesh is greater than a predetermined threshold length.

3. The method of claim 1, wherein the solving the harmonic equation comprises solving a Laplacian equation.

4. The method of claim 1, wherein the method further comprises generating an on-screen representation of the 3D digital model of the archform after applying the tooth-movement displacement vector to the 3D mesh.

5. The method of claim 1, wherein the tooth-movement displacement vector indicates a rotation or a tilting of the tooth.

6. The method of claim 1, further comprising labeling each vertex in the 3D mesh as corresponding to the gingiva or teeth.

7. The method of claim 6, wherein each vertex of the third portion of the 3D mesh is labeled as corresponding to both gingiva and teeth.

8. The method of claim 1, further comprising:
    determining each vertex in the first portion of the 3D mesh by identifying vertices corresponding to the gingiva;
    determining each vertex in the second portion of the 3D mesh by identifying vertices corresponding to the tooth; and
    determining each vertex in the second portion of the 3D mesh by identifying vertices corresponding to both the gingiva and the tooth.

9. The method of claim 1, wherein the determining the respective vertex-specific displacement further includes determining, for each vertex of the first portion of the 3D mesh, a respective distance therefrom to a given vertex of the third portion of the 3D mesh along a surface of the 3D mesh.

10. An apparatus comprising:
    at least one processor; and
    memory storing a plurality of executable instructions, which, when executed by the at least one processor, cause the apparatus to:
        receive a three-dimensional (3D) digital model of an archform comprising a representation of gingiva and a tooth, the 3D digital model comprising a 3D mesh having a plurality of vertices connected to one another other by edges, wherein a first portion of the 3D mesh corresponds to a surface of the gingiva, a second portion of the 3D mesh corresponds to a surface of the tooth, and a third portion of the 3D mesh corresponds to shared vertices defining a contour between the gingiva and the tooth;
        apply a tooth-movement displacement vector to each vertex of the second portion of the 3D mesh, thereby shifting each vertex corresponding to the surface of the tooth by the tooth-movement displacement vector;

apply the tooth-movement displacement vector to each vertex of the third portion of the 3D mesh, thereby shifting each vertex corresponding to the contour by the tooth-movement displacement vector;

determine, for each vertex of the first portion of the 3D mesh, a respective vertex-specific displacement based on the tooth-movement displacement vector, wherein the vertex-specific displacement is determined at least in part by solving a harmonic equation, a boundary condition of the harmonic equation being linked to displacement of vertices of the third portion of the 3D mesh;

the boundary condition being simulated as a Dirichlet boundary condition where a function of displacement for the vertices of the third portion of the 3D mesh is prescribed by the tooth-movement displacement vector;

apply, to each vertex of the first portion of the 3D mesh, the respective vertex-specific displacement, thereby shifting each vertex corresponding to the gingiva; and update the 3D digital model based on the 3D mesh.

11. The apparatus of claim 10, wherein the instructions further cause the apparatus to:

calculate an edge length of each of the edges of the 3D mesh; and adjust the 3D mesh until a length of each of the edges of the 3D mesh is greater than a predetermined threshold length.

12. The apparatus of claim 10, wherein the apparatus is in communication with a display, and wherein the instructions further cause the apparatus to generate an on-screen representation, on the display, of the 3D digital model of the archform after applying the tooth-movement displacement vector to the 3D mesh.

13. The apparatus of claim 10, wherein the tooth-movement displacement vector indicates a rotation or a tilting of the tooth.

14. A method of determining deformation of gingiva, the method being executable by an electronic device, the method comprising:

receiving a three-dimensional (3D) digital model of an archform comprising a representation of the gingiva and a tooth, the 3D digital model comprising a 3D mesh having a plurality of vertices connected to one another other by edges, wherein a first portion of the 3D mesh corresponds to a surface of the gingiva, a second portion of the 3D mesh corresponds to a surface of the tooth, and a third portion of the 3D mesh corresponds to shared vertices defining a contour between the gingiva and the tooth;

determining, for each vertex of the first portion of the 3D mesh, based on a distance between the respective vertex and the tooth, and by solving a harmonic equation, a respective vertex-specific weight, a boundary condition of the harmonic equation being linked to displacement of vertices of the third portion of the 3D mesh;

the boundary condition being simulated as a Dirichlet boundary condition where a function of displacement for the vertices of the third portion of the 3D mesh is prescribed by the tooth-movement displacement vector;

applying a tooth-movement displacement vector to each vertex of the second portion of the 3D mesh, thereby shifting each vertex corresponding to the surface of the tooth by the tooth-movement displacement vector;

applying the tooth-movement displacement vector to each vertex of the third portion of the 3D mesh, thereby shifting each vertex corresponding to the contour by the tooth-movement displacement vector;

determining, for each vertex of the first portion of the 3D mesh, a respective vertex-specific displacement based on the tooth-movement displacement vector and the respective vertex-specific weight;

applying, to each vertex of the first portion of the 3D mesh, the respective vertex-specific displacement, thereby shifting each vertex corresponding to the gingiva; and updating the 3D digital model based on the 3D mesh.

15. The method of claim 14, wherein determining the respective vertex-specific displacement for each vertex of the first portion of the 3D mesh comprises, for each vertex of the first portion of the 3D mesh, multiplying the respective vertex-specific weight by the tooth-movement displacement vector.

16. The method of claim 14, further comprising:

calculating an edge length of each of the edges of the 3D mesh; and adjusting the 3D mesh until a length of each of the edges of the 3D mesh is greater than a predetermined threshold length.

17. The method of claim 14, further comprising:

determining each vertex in the first portion of the 3D mesh by identifying vertices corresponding to the gingiva;

determining each vertex in the second portion of the 3D mesh by identifying vertices corresponding to the tooth; and determining each vertex in the second portion of the 3D mesh by identifying vertices corresponding to both the gingiva and the tooth.

\* \* \* \* \*